(12) United States Patent
Sun et al.

(10) Patent No.: US 9,926,631 B2
(45) Date of Patent: Mar. 27, 2018

(54) AUTOMATIC AMMONIA HYDROXIDE DEPLOYMENT SYSTEM

(71) Applicant: PMAX TECHNOLOGY CORPORATION, McKinney, TX (US)

(72) Inventors: Yu Sun, New Taipei (TW); Jung-Shiung Liau, New Taipei (TW)

(73) Assignee: PMAX TECHNOLOGY CORPORATION, McKinney, TX (US)

( * ) Notice: Subject to any disclaimer, the term of this patent is extended or adjusted under 35 U.S.C. 154(b) by 79 days.

(21) Appl. No.: 14/883,510

(22) Filed: Oct. 14, 2015

(65) Prior Publication Data

US 2017/0107630 A1    Apr. 20, 2017

(51) Int. Cl.
| | | |
|---|---|---|
| *C23F 11/18* | (2006.01) | |
| *C01C 1/02* | (2006.01) | |
| *B01J 19/00* | (2006.01) | |
| *B01J 19/24* | (2006.01) | |

(52) U.S. Cl.
CPC ......... *C23F 11/181* (2013.01); *B01J 19/0006* (2013.01); *B01J 19/24* (2013.01); *C01C 1/022* (2013.01); *B01J 2219/00164* (2013.01); *B01J 2219/00256* (2013.01); *B01J 2219/24* (2013.01)

(58) Field of Classification Search
CPC ........ C23F 11/181; B01J 19/24; B01J 9/0006; C01C 1/022
See application file for complete search history.

(56) References Cited

U.S. PATENT DOCUMENTS

| | | | | |
|---|---|---|---|---|
| 3,605,783 | A * | 9/1971 | Pecker et al. ....... | A61M 1/1656 137/2 |
| 5,158,100 | A * | 10/1992 | Tanaka .................. | B08B 7/0092 134/105 |
| 5,288,333 | A * | 2/1994 | Tanaka .................. | B08B 7/0092 134/11 |
| 2001/0025653 | A1* | 10/2001 | Takura ...................... | E03B 7/02 137/255 |
| 2010/0247383 | A1* | 9/2010 | Okubo .................. | G01N 27/06 422/82.02 |

* cited by examiner

*Primary Examiner* — Regina M Yoo
(74) *Attorney, Agent, or Firm* — Maschoff Brennan

(57) ABSTRACT

An automatic ammonia hydroxide deployment system comprises an ammonia hydroxide deployment device and an automatic ammonia hydroxide deployment controlling device. The ammonia hydroxide deployment device includes a chamber for storing ammonia hydroxide, an ammonia pipe and a water pipe. The automatic ammonia hydroxide deployment controlling device includes an electrical conductivity meter, a liquid level sensor and an operating controller. The electrical conductivity meter is for detecting an electrical conductivity of the ammonia hydroxide in the chamber. The operating controller is configured to obtain an ammonia concentration of the ammonia hydroxide according to the electrical conductivity of the ammonia hydroxide. The operating controller adjusts ammonia gas flowing into the chamber according to whether the ammonia concentration is less than a predetermined threshold or not, and adjusts water flowing into the chamber according to whether the liquid level is lower than a predetermined lower threshold or not.

6 Claims, 2 Drawing Sheets

AUTOMATIC AMMONIA HYDROXIDE DEPLOYMENT SYSTEM

FIELD OF THE INVENTION

The present invention relates to an ammonia hydroxide deployment system, and more particularly to an automatic ammonia hydroxide deployment system.

BACKGROUND OF THE INVENTION

An ammonia hydroxide deployment system can be applied to but not limit to the water supplying system of a thermal power plant or a nuclear power plant for corrosion prevention. However, in prior ammonia hydroxide deployment system, people who prepare the ammonia hydroxide are exposed to ammonia which could lead to safety hazards because of manually deploying the ammonia hydroxide. In addition, in prior art, the ammonia hydroxide is diluted from ammonia solution, which is more expensive than ammonia gas. Therefore, an automatic ammonia deployment system in which the ammonia hydroxide is deployed automatically is needed.

SUMMARY OF THE INVENTION

The present invention is for solving the disadvantages as described above.

Accordingly, the objective of the present invention is to provide an automatic ammonia hydroxide deployment system.

The automatic ammonia hydroxide deployment system of the present invention comprises an ammonia hydroxide deployment device and an automatic ammonia hydroxide deployment controlling device. The ammonia hydroxide deployment device includes a chamber for storing ammonia hydroxide which comprises ammonia gas and water, an ammonia pipe for supplying ammonia gas and a water pipe for supplying water. The chamber is connected to the ammonia pipe and the water pipe. The ammonia pipe is provided with an ammonia valve for regulating the flow of the ammonia gas flowing into the chamber, and the water pipe is provided with a water valve for regulating the flow of the water flowing into the chamber. The automatic ammonia hydroxide deployment controlling device includes an electrical conductivity meter, a liquid level sensor, and an operating controller. The electrical conductivity meter is disposed to detect an electrical conductivity of the ammonia hydroxide of the chamber. The liquid level sensor is disposed to detect a liquid level of the chamber. The operating controller is electrically connected to the electrical conductivity meter, the liquid level sensor, the ammonia valve and the water valve in such a manner that the operating controller is configured to obtain an ammonia concentration of the ammonia hydroxide according to the electrical conductivity of the ammonia hydroxide detected by the electrical conductivity meter. The operating controller controls the ammonia valve to adjust ammonia gas flowing into the chamber according to whether the ammonia concentration is less than a predetermined threshold or not, and the operating controller controls the water valve to adjust water flowing into the chamber according to whether the liquid level is lower than a predetermined lower threshold or not.

According to one embodiment of the present invention, the electrical conductivity meter is further provided with an electrode member disposed within the chamber for detecting the electrical conductivity of the ammonia hydroxide.

According to one embodiment of the present invention, the ammonia pipe is further provided with an ammonia flowmeter for measuring the flow rate of the ammonia gas flowing into the chamber.

According to one embodiment of the present invention, the automatic ammonia hydroxide deployment system further comprises an ammonia-absorbing device including an ammonia-absorbing tank and an introducing pipe and an exhaust pipe, wherein the ammonia-absorbing liquid is stored in the ammonia-absorbing tank, the introducing pipe is connected between the ammonia-absorbing tank and an upper side of the chamber for transporting the excess gas containing ammonia from the chamber to the ammonia-absorbing tank which contains ammonia-absorbing liquid so that the ammonia in the excess gas is absorbed by the ammonia-absorbing liquid, and the exhaust pipe is connected to the ammonia-absorbing tank for exhausting the excess gas out of the ammonia-absorbing tank, in which the ammonia in the excess gas has been absorbed by the ammonia-absorbing liquid.

According to one embodiment of the present invention, the ammonia-absorbing device further comprises a inlet pipe connected between the ammonia-absorbing tank and the chamber in such a manner that the ammonia-absorbing liquid flows from the ammonia-absorbing tank to the chamber through the inlet pipe.

According to one embodiment of the present invention, the water pipe is connected to the chamber via the ammonia-absorbing tank and the inlet pipe, and the ammonia-absorbing liquid in the ammonia-absorbing tank is the water supplied from the water pipe.

According to one embodiment of the present invention, the ammonia-absorbing device further includes an air recovery pipe, wherein the air recovery pipe is connected to the introducing pipe and is provided with an air check valve, and wherein the exhaust pipe is provided with an exhaust check valve, such that after the excess gas in the chamber enters the ammonia-absorbing tank at which the ammonia gas in the excess gas dissolves in the ammonia-absorbing liquid, the remaining gas is discharged out of the tank through the exhaust pipe rather than the air recovery pipe, and the air for being supplied to the ammonia-absorbing tank enters the ammonia-absorbing tank though the air recovery pipe rather than the exhaust pipe.

According to one embodiment of the present invention, the automatic ammonia hydroxide deployment system further comprises a security alarming device including an ammonia gas sensor, a flash-and-sounds alarming member, a remote warning member and a sprinkler member connected to the water pipe, wherein the ammonia gas sensor for detecting the ammonia concentration of the air outside the chamber is connected to the flash-and-sounds alarming member, the remote warning member and the sprinkler member, and wherein the flash-and-sounds alarming member and the remote warning member start up and the sprinkler member sprays water when the ammonia concentration of the air outside the chamber is higher than a preset alarming value.

By means of the technology of the present invention, the deployment of ammonia hydroxide can be operated automatically. The present invention also includes the ammonia-absorbing device for preventing ammonia gas leakage, and also for recycling the ammonia existing in the excess gas. For security reasons, the present invention further includes the security alarming device for monitoring the ammonia concentration of the air outside the chamber.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
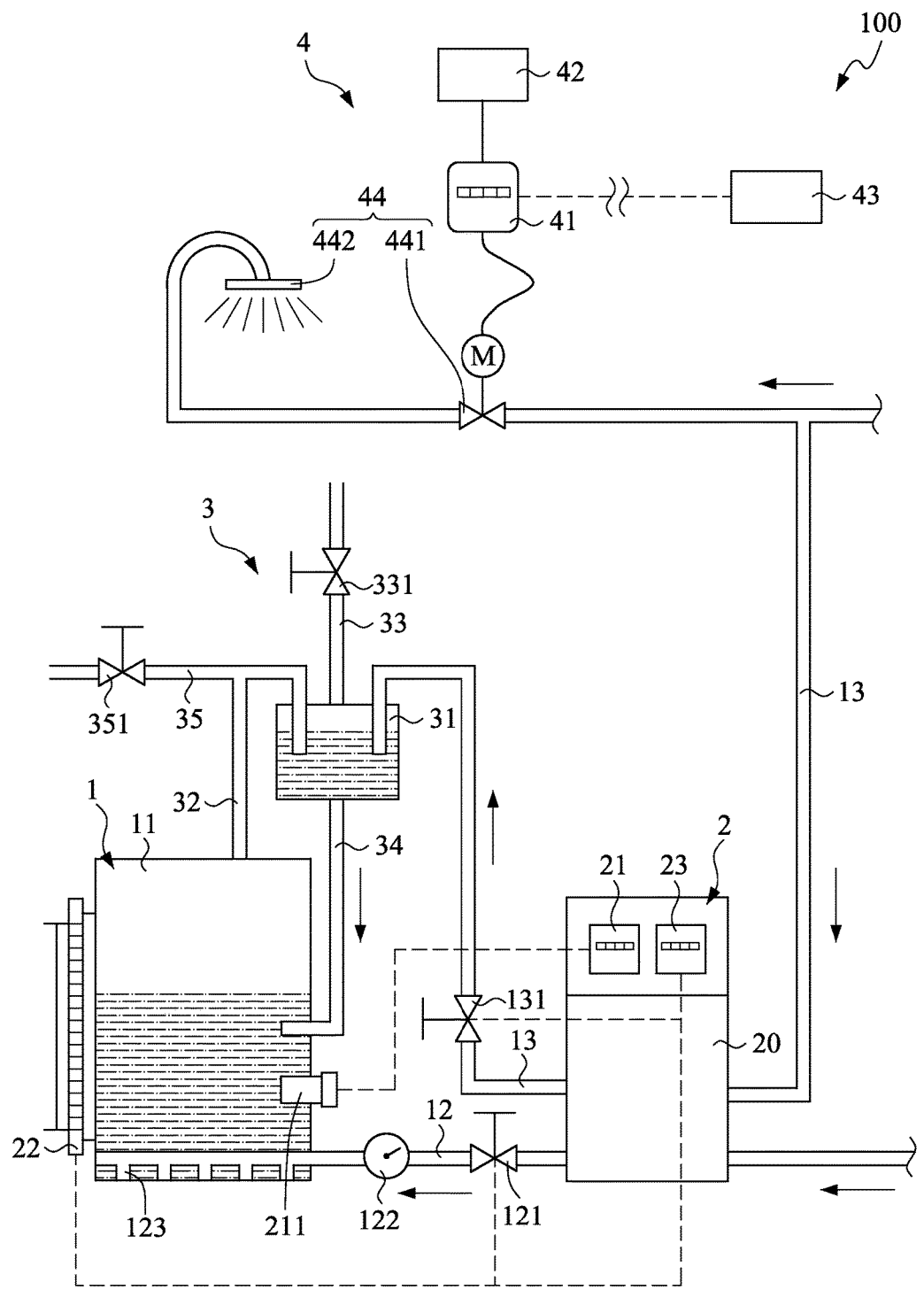
FIG. 1 is a schematic diagram illustrating the automatic ammonia hydroxide deployment system according to one embodiment of the present invention.

Please refer to FIG. 1, which is a schematic diagram illustrating the automatic ammonia hydroxide deployment system according to an embodiment of the present invention. The automatic ammonia hydroxide deployment system 100 comprises an ammonia hydroxide deployment device 1 and an automatic ammonia hydroxide deployment controlling device 2.

The ammonia hydroxide deployment device 1 includes a chamber 11 for storing ammonia hydroxide which comprises ammonia gas and water, an ammonia pipe 12 for supplying ammonia gas and a water pipe 13 for supplying water. The chamber 11 is made of corrosion resistant material, such as metal or plastic, and the chamber 11 is connected to the ammonia pipe 12 and the water pipe 13. The ammonia pipe 12 is provided with an ammonia valve 121 and an ammonia flowmeter 122. The ammonia valve 121 is for regulating the flow of the ammonia gas flowing into the chamber 11, and the ammonia flowmeter 122 is for measuring the flow rate of the ammonia gas flowing into the chamber 11. The ammonia pipe 12 is further provided with a distribution tube 123, which is disposed in the bottom of the chamber 11 for diffusing ammonia gas uniformly. The water pipe 13 is provided with a water valve 131 for regulating the flow of the water flowing into the chamber 11.

The automatic ammonia hydroxide deployment controlling device 2 includes a controlling cabinet 20, an electrical conductivity meter 21, a liquid level sensor 22, and an operating controller 23. The electrical conductivity meter 21 and the operating controller 23 are disposed in the controlling cabinet 20, wherein the electrical conductivity meter 21 is disposed to detect an electrical conductivity of the ammonia hydroxide of the chamber 11. In detail, the electrical conductivity meter 21 is provided with an electrode member 211 disposed within the chamber 11 for detecting the electrical conductivity of the ammonia hydroxide.

The liquid level sensor 22 is disposed to detect a liquid level of the chamber 11, and the operating controller 23 is electrically connected to the electrical conductivity meter 21, the liquid level sensor 22, the ammonia valve 121, and the water valve 131 in such a manner that the operating controller 23 is configured to obtain an ammonia concentration of the ammonia hydroxide according to the electrical conductivity of the ammonia hydroxide detected by the electrical conductivity meter 21.

The operating controller 23 controls the ammonia valve 121 to adjust ammonia gas flowing into the chamber 11 according to whether the ammonia concentration is less than a predetermined threshold or not. The predetermined threshold is adjustable. In detail, if the ammonia concentration of the ammonia hydroxide is less than the predetermined lower threshold, the operating controller 23 sends an open command to the ammonia valve 121, and the ammonia valve 121 accordingly allows ammonia gas to enter the chamber 11 via the ammonia pipe 12. The ammonia gas is absorbed quickly and uniformly by the water, causing the electrical conductivity to increase. The electrical conductivity meter 21 detects the electrical conductivity at all times, and the operating controller 23 determines the ammonia concentration of the ammonia hydroxide. If the ammonia concentration reaches the predetermined threshold, the operating controller 23 sends a close command to the ammonia valve 121, and the ammonia valve 121 accordingly stops the supply of the ammonia gas. In this embodiment, the operating controller 23 is a programmable logic controller. However, the present invention is not limited to this, and the operating controller 23 can be a controller other than the programmable logic controller.

Besides, the operating controller 23 controls the water valve 131 to adjust water flowing into the chamber 11 according to whether the liquid level is lower than a predetermined lower threshold or not. In detail, the liquid level sensor 22 detects the liquid level of the chamber 11 and sends signals to the operating controller 23. When the liquid level is lower than the predetermined lower threshold, the operating controller 23 sends an open command to the water valve 131, and the water valve 131 accordingly allows water to enter the chamber 11 via the water pipe 13. When the liquid level reaches a predetermined higher threshold, the operating controller 23 sends a close command to the water valve 131, and the water valve 131 accordingly stops the water supplying. In general, the water supply and the ammonia gas supply are operated simultaneously. In other cases, ammonia gas supply delays slightly. The predetermined lower threshold and the predetermined higher threshold are adjustable. However, the predetermined lower threshold cannot be lower than zero, and the predetermined higher threshold cannot exceed the upper limit of the liquid level sensor 22.

Figure 2:
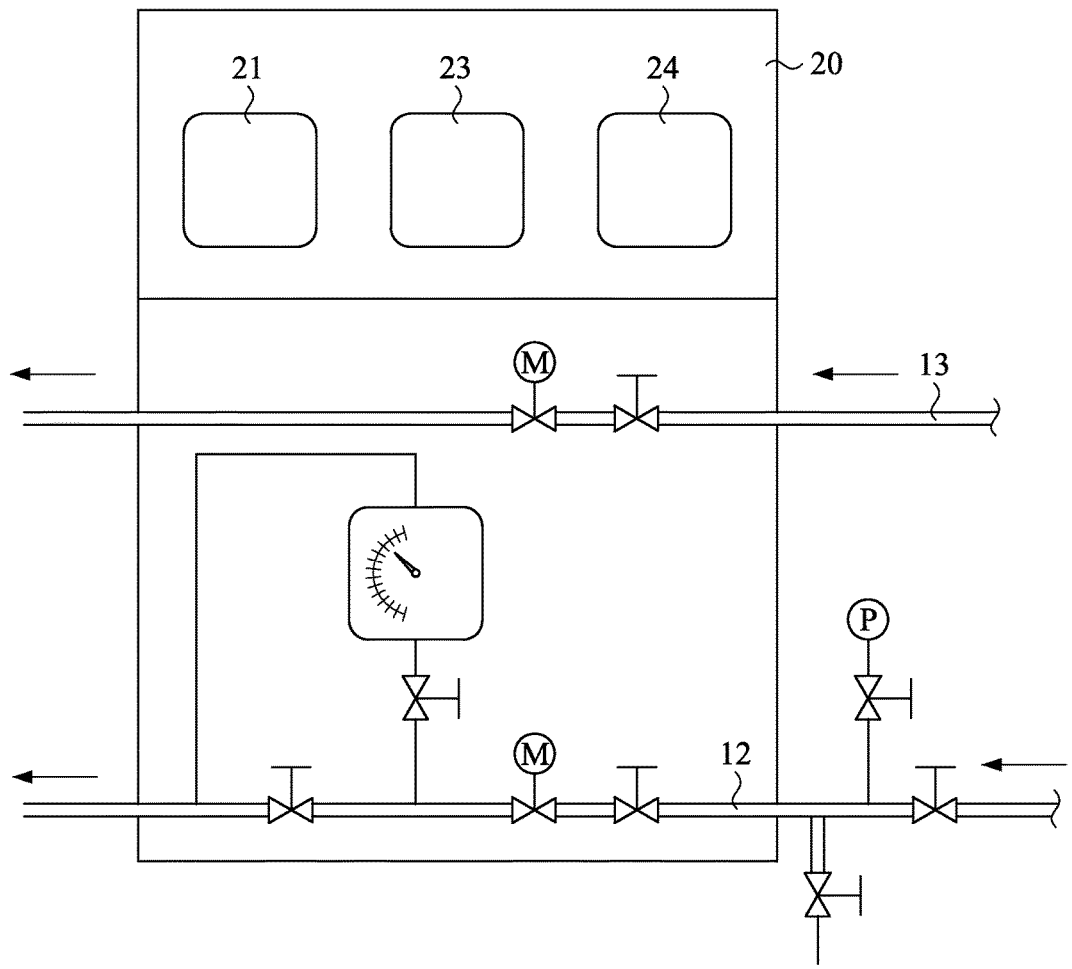
FIG. 2 is a partial schematic diagram illustrating the schematic diagram according to the embodiment of the present invention.

As shown in FIG. 2, which is a partial schematic diagram illustrating the schematic diagram according to an embodiment of the present invention, the ammonia pipe 12 and the water pipe 13 pass through the controlling cabinet 20, and the automatic ammonia hydroxide deployment controlling device 2 further includes a display panel 24, which is disposed on the controlling cabinet 20 and could show the electrical conductivity of the ammonia hydroxide detected by the electrical conductivity meter 21, the ammonia concentration of the ammonia hydroxide derived from the operating controller 23, and the liquid level of the chamber 11 detected by the liquid level sensor 22.

According to FIG. 1, the automatic ammonia hydroxide deployment system 100 further comprises an ammonia-absorbing device 3, which includes an ammonia-absorbing tank 31, an introducing pipe 32, and an exhaust pipe 33, wherein the ammonia-absorbing liquid is stored in the ammonia-absorbing tank 31. In this embodiment, the ammonia-absorbing liquid is water. The introducing pipe 32 is connected between the ammonia-absorbing tank 31 and an upper side of the chamber 11 for transporting the excess gas containing ammonia from the chamber 11 to the ammonia-absorbing tank 31 which contains ammonia-absorbing liquid. The excess gas contains ammonia, which is absorbed by the ammonia-absorbing liquid when the excess gas enters the ammonia-absorbing tank 31. The exhaust pipe 33 is connected to the ammonia-absorbing tank 31 for exhausting remaining components out of the ammonia-absorbing tank 31, in which the ammonia in the excess gas has been absorbed by the ammonia-absorbing liquid.

The ammonia-absorbing device 3 further comprises a inlet pipe 34 connected between the ammonia-absorbing tank 31 and the chamber 11. Furthermore, the water pipe 13 is also connected to the chamber 11 via the inlet pipe 34 and the ammonia-absorbing tank 31. By the above method, the ammonia-absorbing liquid in the ammonia-absorbing tank 31 is the water supplied from the water pipe 13, and the ammonia-absorbing liquid flows from the ammonia-absorbing tank to the chamber 11 through the inlet pipe 34.

The changes in liquid level result in the variation of the pressure inside the chamber 11. When the camber 11 is being supplied with water, the liquid level of the chamber 11 arises and leads the increase of the pressure inside the chamber 11. On the contrary, the decrease of the liquid level of the chamber 11 leads to the decrease of the pressure inside the chamber 11. To balance the pressure inside the chamber 11, the exhaust pipe 33 is further provided with an exhaust check valve 331, and the ammonia-absorbing device 3 further includes an air recovery pipe 35, which is connected to the introducing pipe 32 and is provided with an air check valve 351. By the structural method above, when the pressure inside the chamber 11 is larger than a certain pressure value, the excess gas in the chamber 11 enters the ammonia-absorbing tank 31 at which the ammonia in the excess gas dissolves in the ammonia-absorbing liquid, and the remaining components of the excess gas is discharged out of the ammonia-absorbing tank 31 through the exhaust pipe 33 and the exhaust check valve 331 rather than the air recovery pipe 35 and the air check valve 351. On the contrary, when the pressure of the chamber 11 is smaller than a certain pressure value, the air being supplied to the ammonia-absorbing tank 31 enters the ammonia-absorbing tank 31 though the air recovery pipe 35 rather than the exhaust pipe 33. In detail, the air check valve 351 opens and allows the outside air to enter the chamber 11 through the air check valve 351 and the recovery pipe 35 when the pressure of the chamber 11 is smaller than a certain pressure value. In this embodiment, the certain pressure value is the pressure outside the device. It is noted that the present invention is not limited to this.

The automatic ammonia hydroxide deployment system 100 further comprises a security alarming device 4, which includes an ammonia gas sensor 41, a flash-and-sounds alarming member 42, a remote warning member 43, and a sprinkler member 44 connected to the water pipe 13. The ammonia gas sensor 41 for detecting the ammonia concentration of the air outside the chamber 11 is connected to the flash-and-sounds alarming member 42, the remote warning member 43 and the sprinkler member 44. The sprinkler member 44 includes a sprinkler valve 441 and a sprinkler part 442. The sprinkler valve 441 and the sprinkler part 442 are disposed at the water pipe 13, and the sprinkler part 442 is disposed downstream of the sprinkler valve 441. The flash-and-sounds alarming member 42 makes flash and sounds and the remote warning member 43 issues a warning when the ammonia concentration of the air outside the chamber 11 is higher than a preset alarming value, and then the sprinkler valve 441 opens, and the sprinkler part 442 sprays water for absorbing ammonia gas.

By providing an automatic ammonia hydroxide deployment system, the deployment of ammonia hydroxide can be operated automatically. Compared with prior arts, the automatic ammonia hydroxide deployment system can save the costs by more than 80%, and the process of deploying ammonia hydroxide is more precise, safe, and environmentally friendly. Most of all, with the automatic ammonia hydroxide deployment system of the present invention, the operators of the system are saved from being exposed to ammonia, and consequently, the operators are protected from occupational hazards.

The above description should be considered as only the discussion of the preferred embodiments of the present invention. However, a person skilled in the art may make various modifications without deviating from the present invention. Those modifications still fall within the spirit and scope defined by the appended claims.

What is claimed is:

1. An automatic ammonia hydroxide deployment system, comprising:
    an ammonia hydroxide deployment device including a chamber for storing ammonia hydroxide, an ammonia pipe for supplying ammonia gas and a water pipe for supplying water, wherein the chamber is connected to the ammonia pipe and the water pipe, and the ammonia pipe is provided with an ammonia valve for regulating the flow of the ammonia gas flowing into the chamber, and the water pipe is provided with a water valve for regulating the flow of the water flowing into the chamber, and the ammonia gas and the water form said ammonia hydroxide;
    an automatic ammonia hydroxide deployment controlling device including an electrical conductivity meter, a liquid level sensor, and an operating controller, wherein the electrical conductivity meter is disposed to detect an electrical conductivity of the ammonia hydroxide of the chamber, the liquid level sensor is disposed to detect a liquid level of the chamber, and the operating controller is electrically connected to the electrical conductivity meter, the liquid level sensor, the ammonia valve and the water valve in such a manner that the operating controller is configured to determine an ammonia concentration of the ammonia hydroxide according to the electrical conductivity of the ammonia hydroxide detected by the electrical conductivity meter, and the operating controller controls the ammonia valve to adjust ammonia gas flowing into the chamber according to whether the ammonia concentration is less than a predetermined threshold or not, and the operating controller controls the water valve to adjust water flowing into the chamber according to whether the liquid level is lower than a predetermined lower threshold or not; and
    an ammonia-absorbing device including an ammonia-absorbing tank and an introducing pipe and an exhaust pipe, wherein:
    an ammonia-absorbing liquid is stored in the ammonia-absorbing tank,
    the introducing pipe is connected between the ammonia-absorbing tank and an upper side of the chamber for transporting an excess gas containing ammonia from the chamber to the ammonia-absorbing tank which contains ammonia-absorbing liquid so that the ammonia in the excess gas is absorbed by the ammonia-absorbing liquid, and
    the exhaust pipe is connected to the ammonia-absorbing tank for exhausting remaining components of the excess gas out of the ammonia-absorbing tank, in which the ammonia in the excess gas has been absorbed by the ammonia-absorbing liquid.

2. The automatic ammonia hydroxide deployment system of claim 1, wherein:

the electrical conductivity meter is further provided with an electrode member disposed within the chamber for detecting the electrical conductivity of the ammonia hydroxide.

3. The automatic ammonia hydroxide deployment system of claim 1, wherein:
the ammonia pipe is further provided with an ammonia flowmeter for measuring the flow rate of a ammonia gas flowing into the chamber.

4. The automatic ammonia hydroxide deployment system of claim 1, wherein:
the ammonia-absorbing device further comprises an inlet pipe connected between the ammonia-absorbing tank and the chamber in such a manner that the ammonia-absorbing liquid flows from the ammonia-absorbing tank to the chamber through the inlet pipe.

5. The automatic ammonia hydroxide deployment system of claim 4, wherein:
the water pipe is connected to the chamber via the ammonia-absorbing tank and the inlet pipe, and the ammonia-absorbing liquid in the ammonia-absorbing tank is the water supplied from the water pipe.

6. The automatic ammonia hydroxide deployment system of claim 1, wherein:
the ammonia-absorbing device further includes an air recovery pipe,
the air recovery pipe is connected to the introducing pipe and is provided with an air check valve, and
the exhaust pipe is provided with an exhaust check valve such that after the excess gas in the chamber enters the ammonia-absorbing tank at which the ammonia in the excess gas dissolves in the ammonia-absorbing liquid, the remaining components of the excess gas is discharged out of the ammonia-absorbing tank through the exhaust pipe rather than the air recovery pipe, and the air being supplied to the ammonia-absorbing tank enters the ammonia-absorbing tank through the air recovery pipe rather than the exhaust pipe.

* * * * *